United States Patent [19]
Stevens

[11] Patent Number: 5,755,037
[45] Date of Patent: May 26, 1998

[54] LEVEL

[75] Inventor: John Stevens, Johnson City, Tenn.

[73] Assignee: Great Neck Saw Manufactures, Inc., Mineola, N.Y.

[21] Appl. No.: 617,211

[22] Filed: Mar. 18, 1996

[51] Int. Cl.⁶ .................................................. G01C 9/28
[52] U.S. Cl. ................................................ 33/382; 33/379
[58] Field of Search .......................... 33/370, 371, 379, 33/381, 382, 383

[56] References Cited

U.S. PATENT DOCUMENTS

| | | |
|---|---|---|
| D. 280,185 | 8/1985 | Wright. |
| D. 301,553 | 6/1989 | Makofsky. |
| D. 320,360 | 10/1991 | Kennedy. |
| D. 332,226 | 1/1993 | Hutchins. |
| D. 333,991 | 3/1993 | Lee. |
| D. 335,134 | 4/1993 | Kennedy. |
| D. 337,279 | 7/1993 | Styles. |
| 3,186,100 | 6/1965 | Nakano ............................ 33/379 |
| 3,747,221 | 7/1973 | Ostrager ........................... 33/382 |
| 4,109,392 | 8/1978 | Streeter ............................ 33/381 |
| 4,590,682 | 5/1986 | Koch ................................ 33/383 |
| 4,593,475 | 6/1986 | Mayers. |
| 4,653,193 | 3/1987 | Kennedy et al. ................ 33/379 |
| 4,765,061 | 8/1988 | Rawlings ........................ 33/379 |
| 4,829,676 | 5/1989 | Waldron. |
| 4,977,680 | 12/1990 | Marshall ......................... 33/371 |
| 5,207,004 | 5/1993 | Gruetzmacher ................. 33/379 |

FOREIGN PATENT DOCUMENTS

| | | | |
|---|---|---|---|
| 1498057 | 3/1970 | Germany | 33/381 |
| 3127299 | 1/1983 | Germany | 33/379 |
| 3215667 | 10/1983 | Germany | 33/379 |
| 3805989 | 9/1989 | Germany | 33/379 |

*Primary Examiner*—Thomas B. Will
*Attorney, Agent, or Firm*—Joseph J. Previto

[57] ABSTRACT

A level having a body portion and one or more openings in the body portion. A vial is mounted in the opening in the body portion. The body portion has vial-recieving seats adjoining the openings which have end walls. The vial-receiving seats have locating elements spaced from the end walls. The locating elements may be in the form of a protrusion or a ridge. In addition, the body of the level has a groove to receive a magnet. The groove is deep enough so that the surface of the level is flush with the surface of the magnet.

11 Claims, 2 Drawing Sheets

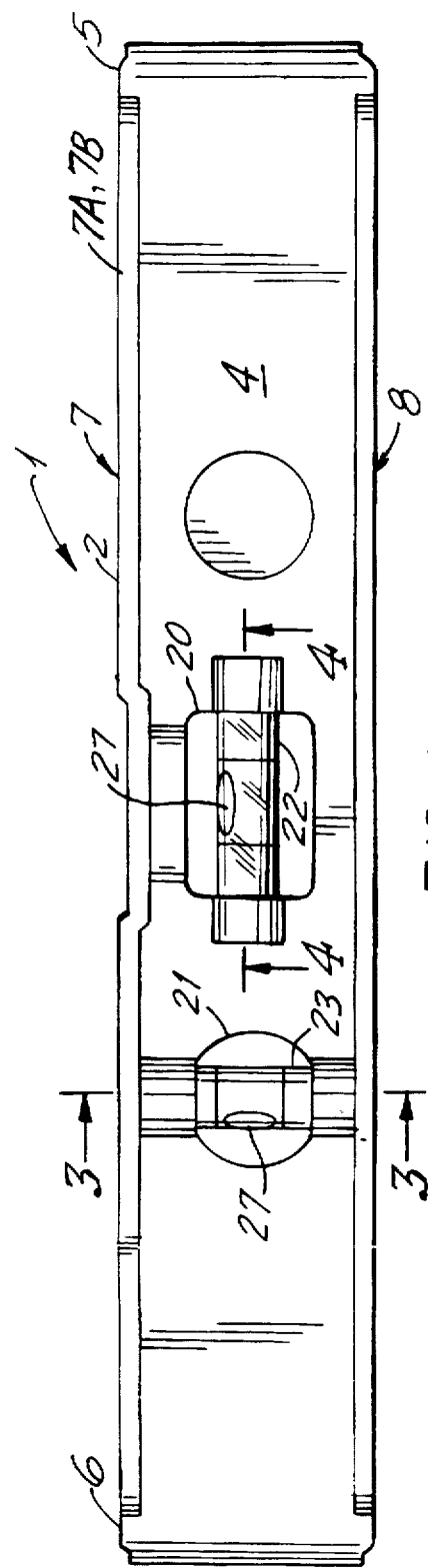
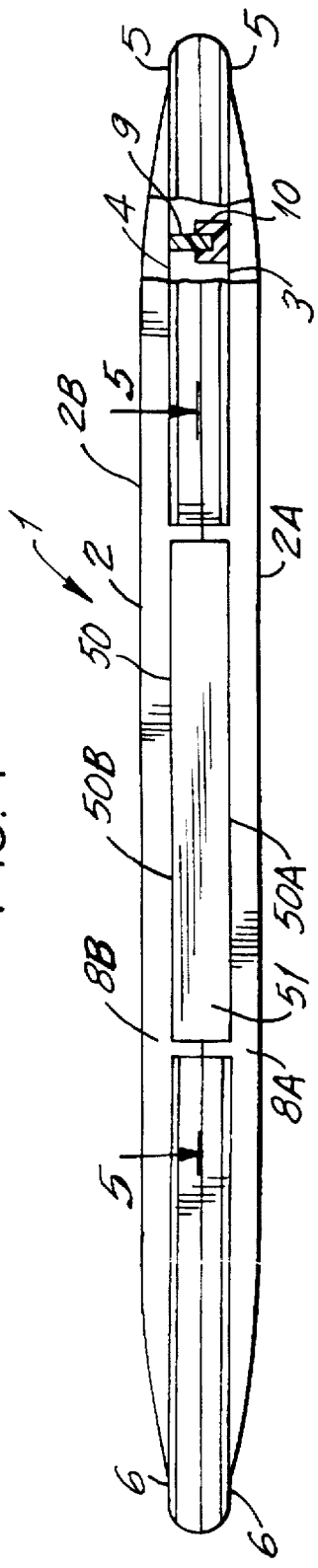
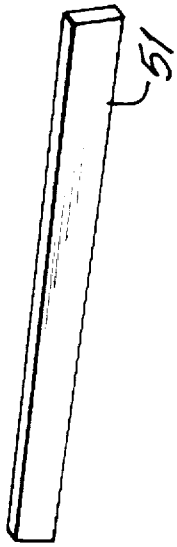
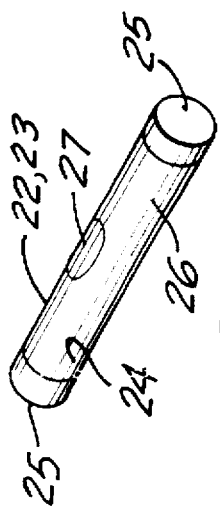
FIG. 1
FIG. 2
FIG. 6
FIG. 7

1

LEVEL

BACKGROUND

The present invention relates to a spirit level and more particularly to an improved spirit level for determining whether a particular surface is planar.

Spirit levels comprise a body with a straight edge and one or more sealed vials with an internal cavity having a liquid therein. The liquid does not fill the entire cavity in the vial thereby leaving an air bubble which assumes various positions within the cavity depending on the orientation of the level. When applying the level to a surface, if the bubble assumes a centrally located position in the cavity, the surface is planar—otherwise, it is not. The vials preferably are positioned at various angles on the level body so that the planar integrity of a particular surface may be easily determined whether the surface is horizontal, vertical or in between it is important to have the vials accurately located in the body of a level so that when the user applies the level to a surface he will be certain that the position of the of the bubble accurately indicates whether or not the surface is planar.

In preparing such levels, it has been difficult for the vials to be properly located within the body of some levels without incurring expensive and time consuming positioning mechanisms. Another drawback of some existing levels is that magnets adapted to keep the level against a metal pipe or surface have not been flush with the body of the level.

OBJECTS

The present invention overcomes these drawbacks and has for one of its objects the provision of an improved level with accurately positioned vials which is inexpensive to manufacture.

Another object of the present invention is the provision of an improved level which has means in the level body for positively and accurately positioning the vials in the proper locations without the use of expensive positioning mechanisms.

Another object of the present invention is the provision of an improved level which has means for the magnetic portion of the level to be on the same plane with a surface of the level.

Other and further objects of the invention will be obvious upon an understanding of the illustrative embodiment about to be described or will be indicated in the appended claims, and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification wherein:

FIG. 1 is a side plan view of a level embodying the present invention.

FIG. 2 is a bottom plan view thereof.

FIG. 6 is a perspective view of a magnet which may be used with the present invention.

FIG. 7 is a perspective view of a vial which may be used with the present invention.

DESCRIPTION

Figure 3:
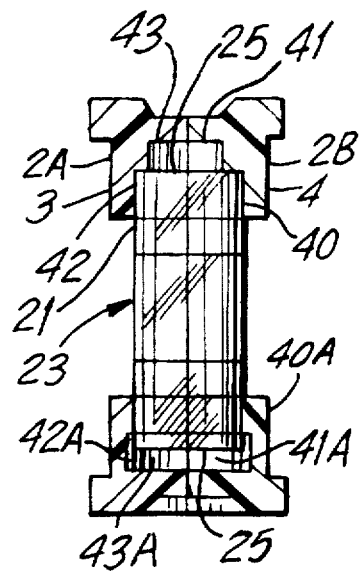
FIG. 3 is a sectional view taken along line 3-3 of FIG. 1.
Figure 4:
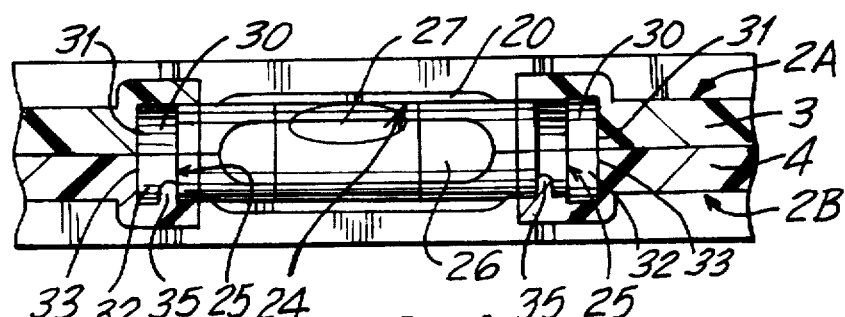
FIG. 4 is a sectional view taken along line 4-4 of FIG. 1.
Figure 5:
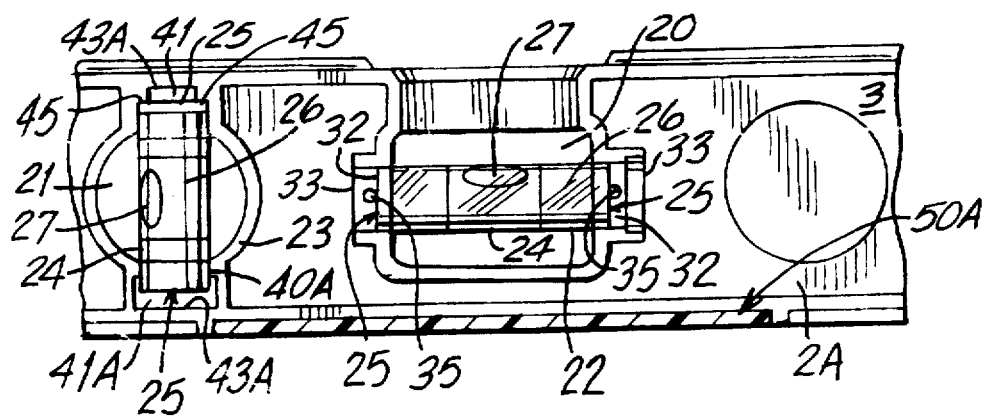
FIG. 5 is a sectional view taken along line 5-5 of FIG. 1.

Referring to the drawings, the level 1 of the present invention comprises a body portion 2 having a pair of side walls 3-4, a pair of end walls 5-6, a top wall 7 and a bottom wall 8. The body portion 2 is comprised of two halves 2A-2B, which are assembled together and adhered to each other to form the body portion 2. Each half 2A-2B has a side wall 3-4, respectively, and end walls 5-6, respectively. Each half 2A-2B comprises top wall portions 7A-7B and bottom wall portions 8A-8B which compliment and are assembled to each other in order to form the top wall 7 and bottom wall 8 when the completed level 1 is assembled. The inner surface of one of the side walls (such as side wall 4) has a plurality of spaced protrusions 9 (only one shown) and the inner surface of the other side wall 3 has a plurality of spaced sockets 10 (only one shown.) The protrusions 9 are adapted to be inserted into the sockets 10 when the two halves 2A-2B are assembled together. The two halves 2A-2B may be adhered together in any convenient or well known manner, such as by sonar welding.

A plurality of vial receiving openings 20 and 21 (two shown) are provided in each half 2A-2B. The openings 20 in each half 2A-2B communicate with each other and the openings 21 in each half 2A-2B also communicate with each other so that the vials can be viewed from either side of the body portion 2 when the two halves 2A-2B are assembled together. As shown in the drawing, one of the openings 20 is generally centrally located on the body and is shown as being substantially rectangular with its long axis parallel with the long axis of the body portion 2. For convenience this opening 20 will hereinafter be referred to as the horizontal opening. The other opening 21 is shown as being substantially circular with its axis perpendicular to the axis of the central opening 20. Hereinafter, for convenience, the opening 21 will be referred to as the vertical opening. It will be understood that while two openings 20 and 21 are shown in the drawing it is within the purview of the present invention to have a greater or lesser number of openings than shown the two in the drawing. It is also within the purview of the present invention for the shapes and the axial orientations of the two openings 20 and 21 to be different from that shown in the drawing.

The vials 22 and 23 which are to be used with the present invention are preferably tubular and cylindrical with a typical one being shown in FIG. 7. Each vial 22 and 23 is elongated and has a hollow interior cavity 24 to receive a fluid 26. The ends 25 of the vials 22 and 23 are hermetically sealed to prevent the fluid 26 from leaking. The fluid 26 does not fill the entire cavity to leave a bubble 27 in the cavity 24 which will move from one end of the cavity 24 to the other depending on the orientation of the level with respect to a surface. It will be understood that vials with other constructions an configurations may also be used without departing from the present invention.

The horizontal central opening 20 is shown as accommodating a vial 22 in a horizontal orientation, i.e. an orientation which is parallel to the long axis of the level. A pair of semicircular receiving seats 30 with end walls 31 are provided in the side wall 3 on the half 2A. The side wall 4 of the other half 2B is also provided with semi-circular receiving seats 32 with end wall 33. Each semi-circular receiving seat 32 has been provided with locating protrusions 35 spaced inwardly from the end walls 33. The semi-circular receiving seats 30 in the other half 2A is not shown as having similar protrusions. However, it will be understood that the other semicircular receiving seats 30 may also have corresponding protrusions without departing from the present invention. When the vial 22 is to be assembled on the central opening 20, the first hemispherical portions of ends 25 of the vial 22 are placed on the semi-circular seating surfaces 32 between the two protrusions 35 which will locate the vial 2 in the proper position within the opening 20 with the ends 25 of the vial spaced from the end walls 33 of the seating surfaces 32. When the other half 2B is superimposed on the half 2A, the seats 30 will receive the second hemispherical portions of the vial ends 25.

The other opening 21 which is adapted to receive a vertically oriented vial 23 has a pair of opposed vial semi-circular receiving seats 40–40A in side wall 4 of half 2B for receiving the ends of the vial 23 spaced from the end wall 41–41 A. The side wall 3 of half 2A also has a pair of semicircular receiving seats 42–42A spaced from its end walls 43–43A. The semi-circular seats 40–42 have a locating ridge 45 to prevent the vials from striking end walls 41–43. With this construction, the vial 23 is placed between halves 2A–2B in the semi-circular receiving seats 40–40A, with the ends of the vial abutting the spacer ridge 45 so that its end is spaced from the end walls 41–43. Hence, the vial 23 will be mounted in the proper position and cannot change its orientation when the level is in use.

The bottom wall 8 of the level 1 has an elongated rectangle indentation 50 formed by a groove 50A–50B in the two halves 2A–2B which make up the body portion 2. The indentation 50 is deep enough to receive a strip or bar magnet 51 such as the one shown in FIG. 6. The magnet 51 is preferably made of magnetized rubber or similar material. When the strip magnet 51 is placed in the groove 50 its top edge will be flush with the bottom edge of the lower wall 8 so that when the body portion 2 is placed against a surface the entire bottom wall 8 as well as the surface of the magnet 51 will be flush with the surface to insure accuracy.

The level of the present invention may be assembled by placing the vial 22 horizontally between the side walls 3–4 of halves 2A–2B with its edges received in the semi-circular receiving seats 30–32 and between the two locating protrusions 35. The other vial 23 is also placed between side walls 3–4 of halves 2A–2B vertically in the semi-circular seats 40–42 and 40A–42A so that the ends of the vial 23 sits in the semi-circular seats 40–42 and 40A–42A with the end of the vial abutting the locating ridge 45. The two halves 2A–2B may then be adhered together and the magnetic rubber strip 51 is placed into the groove 50 in order to complete the level.

It will thus be seen that the present invention provides an improved level with accurately positioned vials which is inexpensive to manufacture, which has means in the level body for positively and accurately positioning the vials in the proper locations without the use of expensive positioning mechanisms and which has means for the magnetic portion of the level to be on the same plane with a surface of the level.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed and defined as follows:

1. A level comprising a body portion, at least one opening in said body portion, a vial having opposed end edges mounted in said body portion, said body portion having means adjacent opposed edges of the opening for receiving said vial, said vial-receiving means having opposed end walls, and locating means on at least one of said vial receiving means for spacing at least one end edge of the vial from one of the said walls, said locating means extending from said body portion, said end walls being substantially perpendicular to said body portion, the end edges of the vial being substantially parallel to the said end walls.

2. A level as set forth in claim 1, wherein said locating means are provided on both vial-receiving means.

3. A level as set forth in claim 2, wherein said locating means are protrusions extending from the vial-receiving means and spaced inwardly from said end walls.

4. A level as set forth in claim 3, wherein said body portion is comprised of two halves assembled together.

5. A level as set forth in claim 1, wherein said locating means comprises a ridge spaced inwardly from one of said end walls.

6. A level as set forth in claim 1, wherein a pair of openings are provided in the body portion, one of said openings being a horizontal opening and the other of said openings being a vertical opening, said body portion being comprised of two halves.

7. A level as set forth in claim 6, wherein said horizontal opening has said locating means adjacent each vial-receiving means.

8. A level as set forth in claim 7, wherein said locating means are provided in one of the two halves that make up the body of the level.

9. A level as set forth in claim 6, wherein said locating means in the vertical opening is located in both of the halves of the level.

10. A level as set forth in claim 9, wherein said locating means is a ridge spaced from one of the end walls.

11. A level as set forth in claim 1, wherein the body portion has a cavity adapted to receive a bar magnet and wherein the opening in the body portion is deep enough so that the surface of the bar magnet is flush with the surface of the body portion.

* * * * *